US009152456B2

(12) United States Patent
Titzer et al.

(10) Patent No.: US 9,152,456 B2
(45) Date of Patent: Oct. 6, 2015

(54) EFFICIENT PER-THREAD SAFEPOINTS AND LOCAL ACCESS

(75) Inventors: Benjamin L. Titzer, Mountain View, CA (US); Bernd J. W. Mathiske, Sunnyvale, CA (US); Karthikeyan Manivannan, Irvine, CA (US)

(73) Assignee: ORACLE AMERICA, INC., Redwood Shores, CA (US)

( * ) Notice: Subject to any disclaimer, the term of this patent is extended or adjusted under 35 U.S.C. 154(b) by 1330 days.

(21) Appl. No.: 12/359,114

(22) Filed: Jan. 23, 2009

(65) Prior Publication Data

US 2010/0192139 A1 Jul. 29, 2010

(51) Int. Cl.
*G06F 9/45* (2006.01)
*G06F 9/48* (2006.01)
*G06F 9/52* (2006.01)
*G06F 11/36* (2006.01)

(52) U.S. Cl.
CPC ........ *G06F 9/485* (2013.01); *G06F 9/52* (2013.01); *G06F 11/3612* (2013.01)

(58) Field of Classification Search
CPC .................................. G06F 9/50; G06F 12/02
USPC .......... 717/151–159; 707/713–721, 759–768, 707/802, 809–811; 712/228, 233–240; 718/104, 406, 108
See application file for complete search history.

(56) References Cited

U.S. PATENT DOCUMENTS

| | | | | |
|---|---|---|---|---|
| 5,542,075 A * | 7/1996 | Ebcioglu et al. | ............... | 717/151 |
| 5,623,663 A * | 4/1997 | Morgan et al. | ................ | 718/100 |
| 5,768,596 A * | 6/1998 | Chow et al. | ................... | 717/154 |
| 6,021,272 A * | 2/2000 | Cahill et al. | .................. | 717/147 |
| 6,308,319 B1 * | 10/2001 | Bush et al. | ..................... | 717/141 |
| 6,327,391 B1 * | 12/2001 | Ohnishi et al. | ................ | 382/236 |
| 7,305,582 B1 * | 12/2007 | Moser et al. | ..................... | 714/13 |
| 7,346,902 B2 * | 3/2008 | Dutt et al. | ..................... | 717/149 |
| 7,716,638 B2 * | 5/2010 | Thornton | ...................... | 717/121 |
| 7,770,163 B2 * | 8/2010 | Stoodley et al. | .............. | 717/158 |
| 2003/0149960 A1 * | 8/2003 | Inamdar | ........................ | 717/118 |
| 2005/0108697 A1 * | 5/2005 | Ogasawara et al. | ........... | 717/152 |
| 2010/0122073 A1 * | 5/2010 | Narayanaswamy et al. | .. | 712/244 |

OTHER PUBLICATIONS

Robert Sedgewick & Kevin Wayne, Introduction to Programming in Java, Jul. 2007, Addison-Wesley, Edition 1, section 5.3 first page.*

* cited by examiner

*Primary Examiner* — Chat Do
*Assistant Examiner* — Sergio J Curbelo, III
(74) *Attorney, Agent, or Firm* — Park, Vaughan, Fleming & Dowler LLP; Chia-Hsin Suen

(57) ABSTRACT

Some embodiments of the present invention provide a system that implements a safepoint for a thread, which includes a compiler and a runtime environment. During compilation of an application to be executed by the thread, the compiler obtains a register to be associated with the thread and inserts safepoint code into the application, wherein the safepoint code includes an indirect load from a memory location stored in the register to the register. During execution of the application by the thread, the runtime environment writes a thread-specific value for the thread to the register, wherein the thread-specific value corresponds to an enabled value, a triggered value, or a disabled value. In these embodiments, executing the indirect load by the thread causes the thread to trap if the thread-specific value corresponds to the triggered value.

13 Claims, 3 Drawing Sheets

EFFICIENT PER-THREAD SAFEPOINTS AND LOCAL ACCESS

BACKGROUND

1. Field

The present embodiments relate to techniques for executing an application. More specifically, the present embodiments relate to a method and system for implementing efficient per-thread safepoints and local access for the application.

2. Related Art

Software runtime systems may include safepoints at which threads are stopped to enable operations such as walking the threads' execution stacks, garbage collection, and deoptimizing runtime method representations to be performed. Furthermore, safepoints may be implemented using a variety of methods. For example, each safepoint may include a polling instruction that is executed every time a thread passes through the safepoint. The polling instruction may also be used to stop the thread when the safepoint is triggered. Alternatively, the thread may be stopped by dynamically inserting code patches at one or more safepoints.

The highly competitive nature of software runtime environments has also led to a push for improved runtime performance within each runtime environment. However, current safepoint techniques are associated with a number of drawbacks that may adversely affect such runtime performance. In particular, both polling safepoints and code patches may be unable to stop individual threads while maintaining minimal mutator overhead and/or acceptable space overhead. Consequently, requirements for both versatility and efficiency may be difficult to satisfy using conventional safepoint implementations.

SUMMARY

Some embodiments of the present invention provide a system that implements a safepoint for a thread, which includes a compiler and a runtime environment. During compilation of an application to be executed by the thread, the compiler obtains a register to be associated with the thread and inserts safepoint code into the application, wherein the safepoint code includes an indirect load from a memory location stored in the register to the register. During execution of the application by the thread, the runtime environment writes a thread-specific value for the thread to the register, wherein the thread-specific value corresponds to an enabled value, a triggered value, or a disabled value. In these embodiments, executing the indirect load by the thread causes the thread to trap if the thread-specific value corresponds to the triggered value.

In some embodiments, the system also enables access to thread-local variables for the thread through a memory space referenced by the thread-specific value.

In some embodiments, the memory space includes a pointer to mutable thread-local variables and a copy of immutable thread-local variables.

In some embodiments, the memory space corresponds to one of three memory spaces respectively referenced by the enabled value, the triggered value, and the disabled value.

In some embodiments, the same processor instructions are used to access the thread-local variables from each of the three memory spaces.

In some embodiments, the safepoint is associated with at least one of a method entry, a method call site, a method return point, a backwards branch, a backwards branch target, and an exception handler.

In some embodiments, writing the thread-specific value to the register involves writing the thread-specific value to the memory location stored in the register and executing the indirect load to load the thread-specific value into the register.

In some embodiments, the thread is trapped upon executing the indirect load after the triggered value is loaded into the register.

In some embodiments, the triggered value corresponds to at least one of protected memory and an unmapped page.

BRIEF DESCRIPTION OF THE FIGURES

In the figures, like reference numerals refer to the same figure elements.

DETAILED DESCRIPTION

Figure 1:
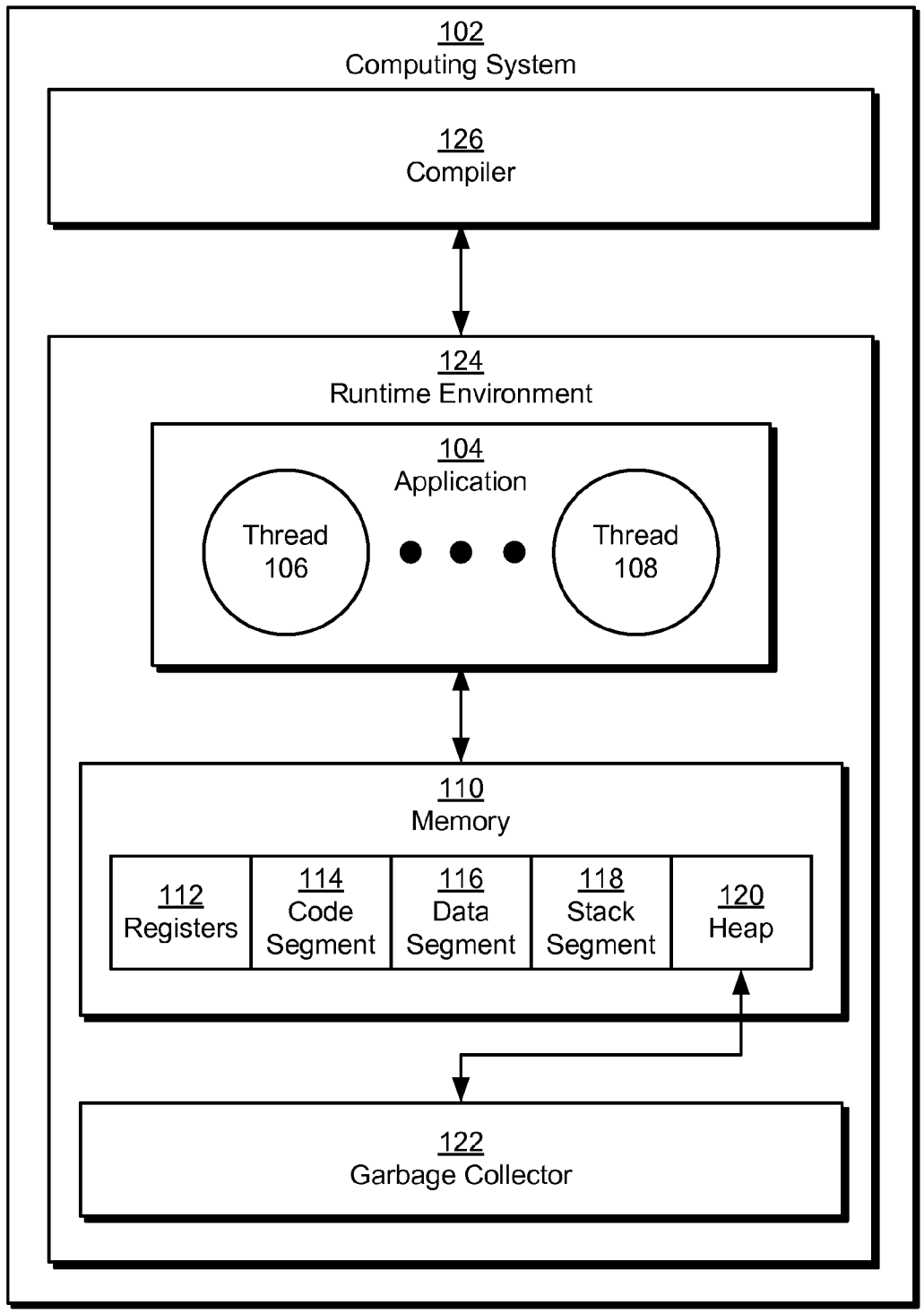
FIG. 1 shows a computing system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments provide a method and system for executing a thread. The thread may be used to execute an application, such as a multithreaded application. As a result, the execution of the thread may be synchronized with the execution of other threads in the application. Furthermore, the thread may be stopped at one or more safepoints to perform tasks such as garbage collection, deoptimization, and/or walking of the thread's execution stack.

More specifically, embodiments provide a method and system for implementing efficient safepoints and local access for the thread. During compilation of the application, safepoint code is inserted as an indirect load from a memory location stored in a register to the register. The safepoint is managed during the thread's execution by writing a thread-specific value to the register that corresponds to an enabled value, a triggered value, or a disabled value. The enabled value may represent an enabled state of the safepoint, the disabled value may represent a disabled state of the safepoint, and the triggered value may represent a triggered state of the safepoint. Consequently, execution of the indirect load after the triggered value is written to the register may cause the thread to trap and pause execution. In addition, efficient access to thread-local variables may be provided by one of three memory spaces respectively referenced by each thread-specific value.

FIG. 1 shows a computing system 102 in accordance with an embodiment. As shown in FIG. 1, computing system 102 includes a compiler 126 for an application 104 and a runtime environment 124 that executes application 104. Runtime environment 124 additionally includes memory 110 used to execute application 104 and a garbage collector 122. Each of these components is described in further detail below.

Computing system 102 may correspond to an electronic device that provides one or more services or functions to a user. For example, computing system 102 may operate as a mobile phone, personal computer, laptop computer, global positioning system (GPS) receiver, portable media player, personal digital assistant (PDA), server, and/or workstation. In addition, computing system 102 may include an operating system (not shown) that coordinates the use of hardware and software resources on computing system 102, as well as one or more applications (e.g., application 104) that perform specialized tasks for the user. For example, computing system 102 may include applications such as an email client, an address book, a document editor, a tax preparation application, a web browser, and/or a media player. To perform tasks for the user, applications may obtain the use of hardware resources (e.g., processor, memory 110, I/O components, wireless transmitter, etc.) on computing system 102 from the operating system, as well as interact with the user through a hardware and/or software framework provided by the operating system.

In one or more embodiments, computing system 102 includes functionality to execute multithreaded applications, such as application 104. In other words, computing system 102 may use multiple threads (e.g., threads 106-108) to perform tasks and/or provide features associated with application 104 and/or other multithreaded applications. Furthermore, the management of multiple executing threads in application 104 may be performed by runtime environment 124 and/or the operating system on computing system 102. For example, threads 106-108 may correspond to user threads that are managed and scheduled by runtime environment 124. Furthermore, threads 106-108 may be mapped one-to-one, many-to-one, or many-to-many to kernel threads that are scheduled and managed across one or more processors of computing system 102 by the operating system.

In addition, threads 106-108 may share the same address space in memory 110 used to execute application 104. More specifically, threads 106-108 may use a set of registers 112, a code segment 114, a data segment 116, a stack segment 118, and/or a heap 120 within the address space of memory 110 to implement the functionality of application 104. For example, threads 106-108 may execute code for application 104 from code segment 114 on registers 112 provided by a processor on computing system 102. In addition, threads 106-108 may have access to global variables in data segment 116 and objects in heap 120. Finally, each thread 106-108 may be associated with a separate call stack in stack segment 118.

As shown in FIG. 1, memory 110 may be managed in part within runtime environment 124 by garbage collector 122. In particular, garbage collector 122 may provide automatic memory management to application 104 by reclaiming memory from objects in heap 120 that are no longer needed by application 104 and/or threads 106-108. However, to determine the liveness and/or reachability of objects in heap 120, garbage collector 122 may require the state of one or more threads 106-108 associated with the objects to be maintained. For example, garbage collector 122 may require a thread's call stack, registers 112, and/or other thread-local variables to be unchanged as garbage collector 122 assesses the reachability of the thread's objects. As a result, the execution of each thread 106-108 may be suspended as garbage collector 122 traces the thread's objects in heap 120. Furthermore, the suspension of threads 106-108 during garbage collection, deoptimization, and/or other operations performed by runtime environment 124 and/or garbage collector 122 may be implemented using safepoints, as described in further detail below.

In one or more embodiments, safepoint code is inserted as instrumentation into application 104 during compilation of application 104 by compiler 126. The compilation may occur prior to the execution of application 104 or during the execution of application 104 (e.g., using just-in-time (JIT) compilation). As a result, compiler 126 may exist separately from runtime environment 124 and/or computing system 102 if application 104 is compiled prior to runtime, or compiler 126 may form a part of runtime environment 124 and/or operate in conjunction with runtime environment 124 on computing system 102 if JIT compilation is utilized.

More specifically, the safepoint code may correspond to an indirect load from a memory location stored in a register (e.g., from registers 112) to the register. For example, safepoint code using a register named "R14" in x86 assembly may correspond to the following:
mov R14, [R14]
In other words, the safepoint code may correspond to a single instruction that reads from a memory location stored in R14 and writes the value stored at the memory location into R14. Such safepoint code may be inserted at method entries, method call sites, return points, backwards branches, backwards branch targets, exception handlers, and/or other areas of application 104 that may be used as safepoints.

In one or more embodiments, the register contains one of three thread-specific values: an enabled value, a triggered value, or a disabled value. Each thread-specific value may represent a safepoint state of the thread 106-108 associated with the register. The enabled value may indicate that safepoints are enabled for the thread, the triggered value may indicate that a safepoint is triggered for the thread, and the disabled value may cause safepoints to be disabled for the thread.

In one or more embodiments, the enabled value and disabled value correspond to self-referencing locations in memory 110. In other words, the enabled value is stored at the memory location referenced by the enabled value, and the disabled value is stored at the memory location referenced by the disabled value. As a result, the execution of the safepoint code with the enabled value or disabled value stored in the register results in a NOOP that executes quickly and with no dependencies. Furthermore, the memory location referenced by the disabled value may be read-only so that safepoints are effectively disabled (e.g., the safepoint code remains a NOOP) when the register stores the disabled value.

To trigger a safepoint, another thread from runtime environment 124 and/or garbage collector 122 may write the triggered value into the memory location referenced by the enabled value. When the thread subsequently executes the safepoint code, the triggered value is loaded into the register instead of the enabled value. In addition, the triggered value may point to a memory location that corresponds to protected memory and/or an unmapped page. For example, the triggered value may reside in low memory that is protected from access by application 104 and/or runtime environment 124. Consequently, execution of the safepoint code a second time after the triggered value is written into the memory location referenced by the enabled value (e.g., after the triggered value is loaded into the register) may result in a hardware protection fault and allow runtime environment 124 to trap the thread. Garbage collection, deoptimization, and/or other operations may then be performed by runtime environment 124 and/or garbage collector 122 after the thread is stopped.

In addition, the triggered value, enabled value, and disabled value may reference memory locations that enable efficient access to thread-local variables for the thread. The thread-local variables may be used for garbage collection, memory allocation, multithreading, locking, and/or other features provided by runtime environment 124 and/or garbage collector 122.

In particular, each thread-specific value may reference a memory space that stores thread-local variables for the thread. As a result, memory 110 may contain three memory spaces—one memory space for each thread-specific value (e.g., enabled value, disabled value, triggered value). In one or more embodiments, each memory space includes a pointer to mutable thread-local variables and a copy of immutable thread-local variables. Moreover, because the memory spaces store thread-local variables in the same format and are respectively referenced by their thread-specific values, the thread-local variables may be accessed using the same processor instructions regardless of the thread-specific value written into the register or the state of the thread. Memory spaces, thread-local variables, and thread-specific values are discussed in further detail below with respect to FIGS. 2A-2B.

In one or more embodiments, safepoints for a thread are disabled by the thread. To disable safepoints, the thread may load the disabled value into the register. Subsequent indirect loads using the disabled value at each safepoint may continually load the disabled value into the register and allow the thread to continue executing past the safepoint. In addition, the inability to write to the memory location referenced by the disabled value may ensure that further execution of the safepoint code has no effect as long as the register stores the disabled value.

To resume execution of the thread after the safepoint is triggered, runtime environment 124 may write the enabled value back into the memory location referenced by the enabled value and into the register. The thread may then resume execution with enabled safepoints. Consequently, runtime environment 124 and/or garbage collector 122 may trigger safepoints for individual threads 106-108 in application 104 with minimal mutator overhead and efficiently access thread-local variables through thread-specific values associated with the safepoints.

Figure 2A:
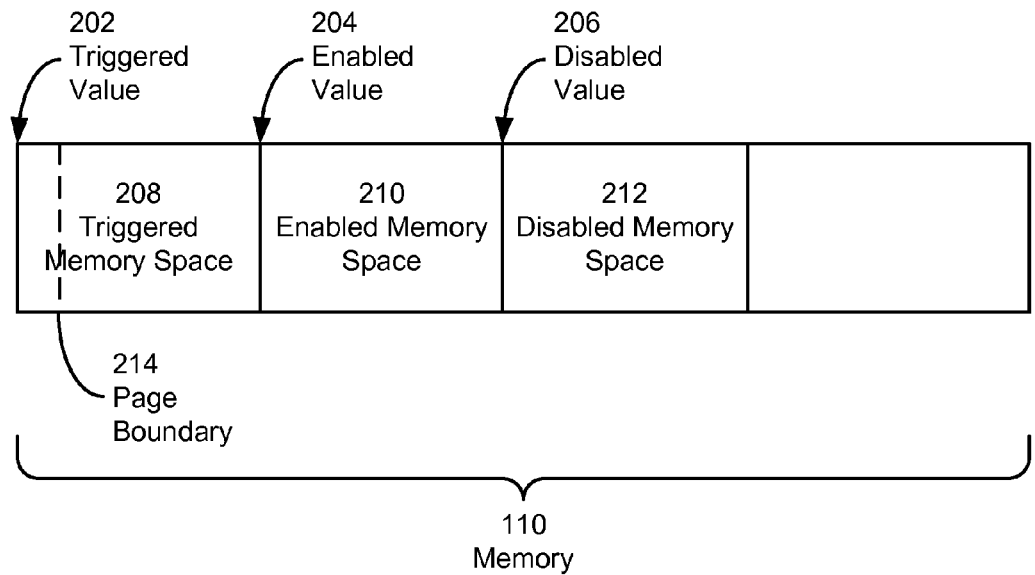
FIG. 2A shows a segment of memory used to implement safepoints in accordance with an embodiment.

FIG. 2A shows a segment of memory 110 used to implement safepoints in accordance with an embodiment. As shown in FIG. 2A, memory 110 includes a triggered memory space 208, an enabled memory space 210, and a disabled memory space 212. Triggered memory space 208 is referenced by a triggered value 202, enabled memory space 210 is referenced by an enabled value 204, and disabled memory space 212 is referenced by a disabled value 206. In one or more embodiments, triggered memory space 208, enabled memory space 210, and disabled memory space 212 are located in the stack segment (e.g., stack segment 118 of FIG. 1) of memory 110.

As described above, triggered value 202, enabled value 204, and disabled value 206 may correspond to safepoint states for a thread executing in a runtime environment, such as runtime environment 124 of FIG. 1. To implement safepoints for the thread, triggered value 202, enabled value 204, or disabled value 206 is written into a register associated with the thread. In addition, the safepoint code may correspond to an indirect load from a memory location stored in the register to the register. As a result, the memory location pointed to by enabled value 204 (e.g., the first word of enabled memory space 210) contains enabled value 204 and the memory location pointed to by disabled value 206 (e.g., the first word of disabled memory space 212) contains disabled value 206. In other words, execution of the safepoint code with enabled value 204 or disabled value 206 stored in the register results in a quickly executing NOOP instruction with no dependencies.

However, when a safepoint is triggered for the thread, triggered value 202 is written into the memory location pointed to by enabled value 204 (e.g., the first word of enabled memory space 210). The first subsequent execution of the safepoint code thus causes triggered value 202 to be loaded into the register. The second subsequent execution of the safepoint code then causes the thread to attempt to load from the memory location pointed to by triggered value 202, which corresponds to unmapped memory across a page boundary 214 and/or protected memory (e.g., low memory). Such an attempt to load from unmapped memory may result in a hardware protection fault and a trapping of the thread.

Those skilled in the art will appreciate that triggered memory space 208, enabled memory space 210, and disabled memory space 212 may be stored in memory 110 using a variety of configurations. For example, triggered memory space 208, enabled memory space 210, and disabled memory space 212 may occupy non-contiguous regions of memory 110. Furthermore, the arrangement of triggered memory space 208, enabled memory space 210, and disabled memory space 212 may be accomplished in a variety of orders as long as triggered value 202 references unmapped and/or protected memory and disabled value 206 references a read-only memory location.

Figure 2B:
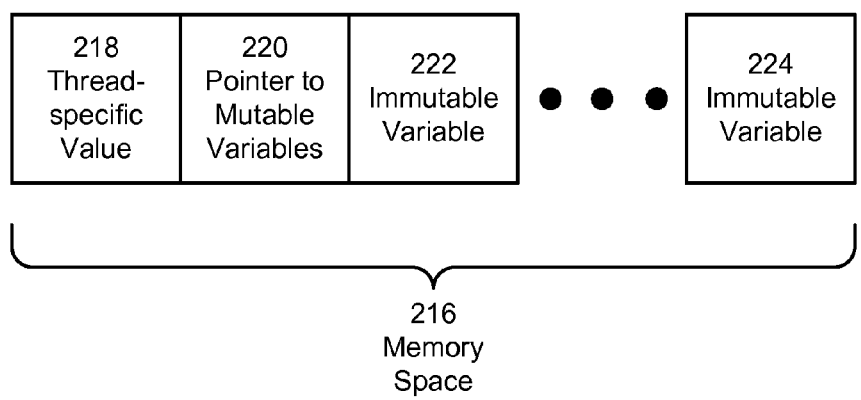
FIG. 2B shows a memory space in accordance with an embodiment.

FIG. 2B shows a memory space 216 in accordance with an embodiment. Memory space 216 may correspond to one of three memory spaces (e.g., triggered memory space 208, enabled memory space 210, disabled memory space 212) referenced by a thread-specific value 218 (e.g., triggered value 202, enabled value 204, disabled value 206). Each thread-specific value 218 may be used to implement safepoints for a thread by representing the safepoint state of an executing thread.

As mentioned previously, memory space 216 may be used to access thread-local variables associated with the thread. For example, thread-local variables for a thread in a Java (Java™ is a registered trademark of Sun Microsystems, Inc.) application may include, but are not limited to:
Thread identifier (ID)
Thread object
Java Native Interface (JNI) environment
Stack top for JNI
Adjusted card table base
Trap information
Reference map for thread stack
Links for a doubly-linked list of all threads
Current allocation pointer
Current allocation maximum Within memory space 216, each thread-local variable may be accessed through an offset to the memory location indicated by thread-specific value 218. In particular, the first word of memory space 216 contains thread-specific value 218 if memory space 216 corresponds to an enabled memory space or a disabled memory space. If memory space 216 corresponds to a triggered memory space, the first word of memory space 216 is in unmapped and/or protected memory.

The second word of memory space 216 contains a pointer to mutable variables 220 associated with the thread. For example, pointer to mutable variables 220 may allow thread-specific variables such as the JNI stack top, trap information, links for a doubly-linked list of all threads, current allocation pointer, and/or current allocation maximum of a Java thread to be accessed and/or modified. Moreover, pointer to mutable variables 220 allows changes to the mutable variables to be stored in one location and accessed through memory space 216 regardless of the thread's safepoint state and/or the memory space used.

Immutable variables 222-224 associated with the thread are stored in subsequent words of memory space 216 and may be accessed through their offsets from thread-specific value 218. For example, memory space 216 may include five read-only variables that are accessed through offsets 2-6 from thread-specific value 218. Because immutable variables 222-224 cannot be altered, a copy of immutable variables 222-224 is stored in each memory space 216 to enable direct access to immutable variables 222-224 using offsets from thread-specific value 218.

Figure 3:
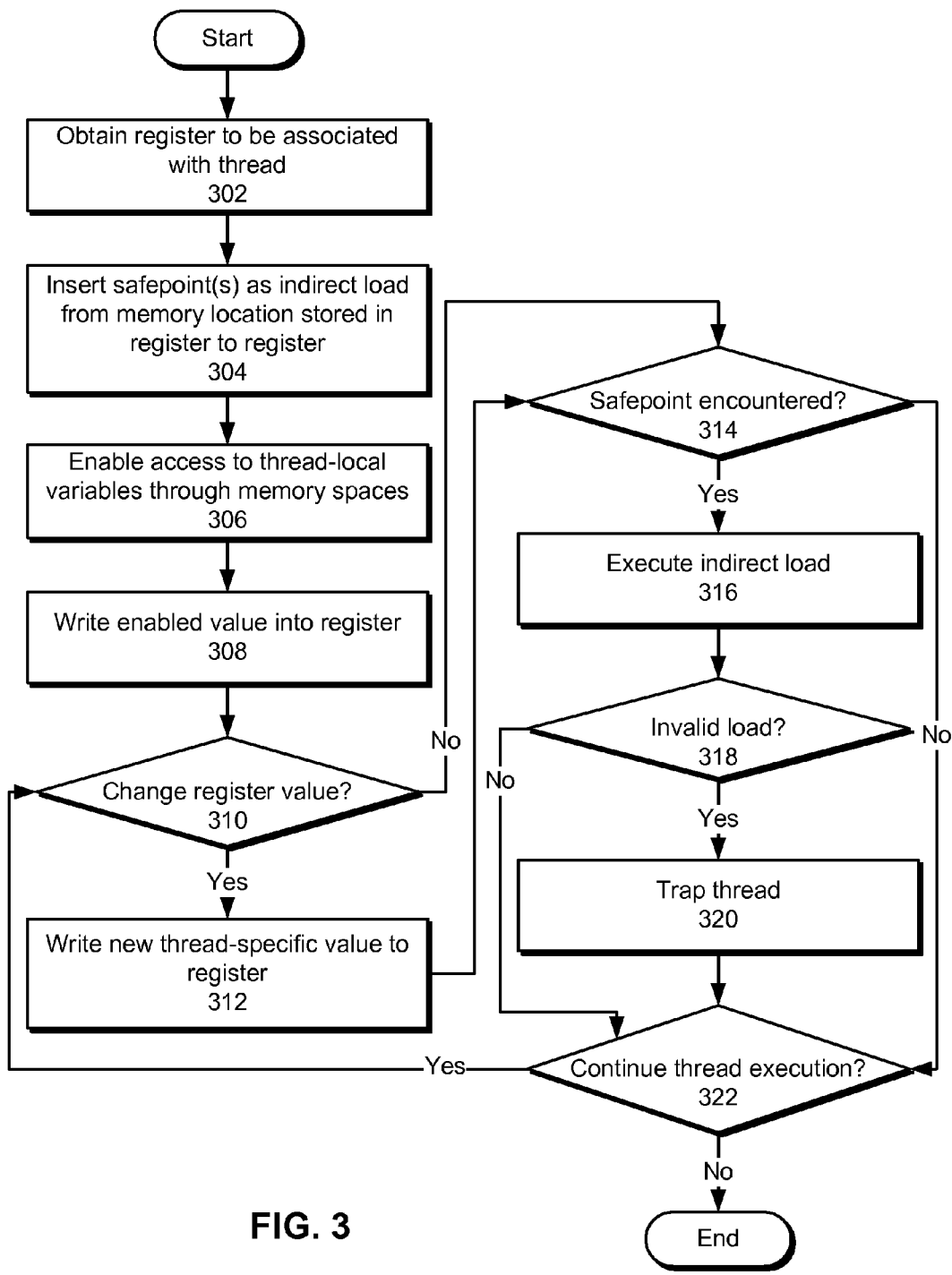
FIG. 3 shows a flowchart illustrating the process of implementing safepoints for a thread in accordance with an embodiment.

As discussed above, thread-local variables may be accessed from memory space 216 using the same processor instructions regardless of the thread's safepoint state. More specifically, using the format of memory space 216 in FIG. 2B, the "kth" immutable variable 222-224 may be read using register "R14", which contains thread-specific value 218, in the following x86 assembly instruction:
mov destination, [R14+k+1]
Similarly, the "nth" mutable variable may be read using register "R14" in the following x86 assembly instructions:
mov pointer, [R14+1]
mov destination, [pointer+n]
Finally, a write of "value" to the "nth" mutable variable may be accomplished using register "R14" in the following x86 assembly instructions:
mov pointer, [R14+1]
mov [pointer+n], value FIG. 3 shows a flowchart illustrating the process of implementing safepoints for a thread in accordance with an embodiment. In one or more embodiments, one or more of the steps may be omitted, repeated, and/or performed in a different order. Accordingly, the specific arrangement of steps shown in FIG. 3 should not be construed as limiting the scope of the technique.

Initially, a register to be associated with the thread is obtained (operation 302). The register may correspond to a processor register that is used to track the safepoint state of the thread by storing one of three thread-specific values: an enabled value, a disabled value, and a triggered value. Next, one or more safepoints are inserted into the application to be executed by the thread as indirect loads from a memory location stored in the register to the register (operation 304). Code for the safepoint(s) may be inserted during compilation of the application, which may occur prior to execution of the application or during the application's runtime. For example, safepoint code may be inserted in a Java application during JIT compilation of the Java application by a Java Virtual Machine.

Access to thread-local variables for the thread is then enabled through memory spaces referenced by the thread-specific values (operation 306). The memory spaces may be created in memory used to execute the application. Each memory space may enable access to the thread-local variables by containing a pointer to mutable variables and a copy of immutable variables. To begin execution of the thread, the enabled value is written into the register (operation 308).

As the thread executes, the register value may be changed (operation 310). For example, the safepoint state of the thread may be altered by changing the register value from the enabled value to the disabled value or to the triggered value. If the register value is to be changed, the new thread-specific value is written to the register (operation 312). In particular, the thread may disable safepoints by writing the disabled value to the register. On the other hand, another thread may trigger a safepoint by writing the triggered value to the register. To write the triggered value to the register, the other thread may write the triggered value to the memory location referenced by the enabled value. The triggered value may then be written to the register when the safepoint code is subsequently executed by the thread in operations 314-316.

As the thread continues executing, a safepoint may be encountered (operation 314). If a safepoint is encountered, the indirect load corresponding to the safepoint is executed (operation 316) by the thread. If the register contains the enabled value or the disabled value, the indirect load may simply load from the memory location the thread-specific value references into the register. Furthermore, thread execution may continue (operation 322) uninterrupted after the safepoint code is executed in an enabled or disabled safepoint state.

However, if the register contains the triggered value, the indirect load may correspond to an invalid load (operation 318) from protected or unmapped memory. Such an invalid load may generate a hardware protection fault and cause the thread to be trapped (operation 320). During suspension of the thread's operation, garbage collection, deoptimization, and/or other operations may be performed by a runtime environment (e.g., runtime environment 124 of FIG. 1) or garbage collector (e.g., garbage collector 122 of FIG. 1) associated with the thread. The runtime environment or garbage collector may additionally access thread-local variables through a memory space enabled in operation 306.

The thread may continue executing (operation 322) if the thread has additional tasks to perform for the application. As the thread executes, the thread's safepoint state may be updated by changing the value of the register (operations 310-312). Similarly, safepoints encountered by the thread may cause the thread to execute the indirect load of the safepoint code (operations 314-316). If the load is invalid, the thread is trapped (operations 318-320). Consequently, the use of an indirect load as safepoint code and thread-specific values to represent safepoint states may allow efficient per-thread safepoints and thread-local access to be implemented for the thread.

The foregoing descriptions of embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present embodiments. The scope of the present embodiments is defined by the appended claims.

What is claimed is:

1. A computer-implemented method for implementing a safepoint for a thread, comprising:
    during compilation of an application to be executed by the thread:
        obtaining a register to be associated with the thread;
        inserting safepoint code into the application, wherein the safepoint code includes an indirect load from a memory location stored in the register to the register;
    and during execution of the application by the thread, writing a thread-specific value for the thread to the memory location stored in the register, wherein the thread-specific value corresponds to an enabled value, a triggered value, or a disabled value;
    wherein, when the thread-specific value corresponds to the triggered value, executing the indirect load by the thread causes a value corresponding to the triggered value to be loaded to the register, and executing the indirect load by the thread after the value corresponding to the triggered value is loaded into the register performs a memory access that causes a protection fault which causes the thread to trap.

2. The computer-implemented method of claim 1, further comprising:
    enabling access to thread-local variables for the thread through a memory space referenced by the thread-specific value, wherein the memory space includes a pointer to mutable thread-local variables and a copy of immutable thread-local variables.

3. The computer-implemented method of claim 1, further comprising:
    enabling access to thread-local variables for the thread through a memory space referenced by the thread-specific value, wherein the memory space corresponds to one of three memory spaces respectively referenced by the enabled value, the triggered value, and the disabled value.

4. The computer-implemented method of claim 3, wherein same processor instructions are used to access the thread-local variables from each of the three memory spaces.

5. The computer-implemented method of claim 1, wherein the safepoint is associated with at least one of a method entry, a method call site, a method return point, a backwards branch, a backwards branch target, and an exception handler.

6. The computer-implemented method of claim 1 wherein the triggered value corresponds to at least one of protected memory and an unmapped page.

7. The computer-implemented method of claim 1, wherein causing the protection fault comprises pausing the execution of the application, and wherein the method further comprises resuming the execution of the application after the trap by writing the enabled value into the register and into the memory spaced that the enabled value points to.

8. The computer-implemented method of claim 1, wherein each of the enabled value, the triggered value, and the disabled value comprises a memory location and points to a memory space that includes a pointer to mutable thread-local variables and a copy of immutable thread-local variables.

9. The computer-implemented method of claim 1, further comprising:
    enabling access to thread-local variables for the thread through a memory space referenced by the thread-specific value.

10. A system for implementing a safepoint for a thread, comprising:
    a processor;
    a memory;
    a compiler, which is stored in the memory and executed by the processor, configured to compile an application to be executed by the thread by:
        obtaining a register to be associated with the thread;
        inserting safepoint code into the application, wherein the safepoint code includes an indirect load from a memory location stored in the register to the register;
    and a runtime environment configured to manage the execution of the thread by writing a thread-specific value of the thread to the memory location stored in the register, wherein the thread-specific value corresponds to an enabled value, a triggered value, or a disabled value;
    wherein, when the thread-specific value corresponds to the triggered value, executing the indirect load by the thread causes a value corresponding to the triggered value to be loaded to the register, and executing the indirect load by the thread after the value corresponding to the triggered value is loaded into the register performs a memory access that causes a protection fault which causes the thread to trap.

11. The system of claim 10, wherein access to thread-local variables for the thread is enabled through a memory space referenced by the thread-specific value and wherein the memory space includes a pointer to mutable thread-local variables and a copy of immutable thread-local variables.

12. The system of claim 10, wherein the safepoint is associated with at least one of a method entry, a method call site, a method return point, a backwards branch, a backwards branch target, and an exception handler.

13. A non-transitory computer-readable storage medium storing instructions that when executed by a computer causes the computer to perform a method for implementing a safepoint for a thread, the method comprising:
    during compilation of an application to be executed by the thread:
        obtaining a register to be associated with the thread;
        inserting safepoint code into the application, wherein the safepoint code includes an indirect load from a memory location stored in the register to the register;
    and during execution of the application by the thread, writing a thread-specific value for the thread to the memory location stored in the register, wherein the thread-specific value corresponds to an enabled value, a triggered value, or a disabled value;
    wherein, when the thread-specific value corresponds to the triggered value, executing the indirect load by the thread causes a value corresponding to the triggered value to be loaded to the register, and executing the indirect load by the thread after the value corresponding to the triggered value is loaded into the register performs a memory access that causes a protection fault which causes the thread to trap.

* * * * *